(12) United States Patent
Matsumura

(10) Patent No.: US 11,936,537 B2
(45) Date of Patent: Mar. 19, 2024

(54) SUPPORT METHOD, SUPPORT SYSTEM, AND COMPUTER PROGRAM

(71) Applicant: IoT-EX Inc., Tokyo (JP)

(72) Inventor: Jun Matsumura, Tokyo (JP)

(73) Assignee: IOT-EX INC., Tokyo (JP)

( * ) Notice: Subject to any disclaimer, the term of this patent is extended or adjusted under 35 U.S.C. 154(b) by 0 days.

(21) Appl. No.: 17/772,583

(22) PCT Filed: Oct. 8, 2020

(86) PCT No.: PCT/JP2020/038135
§ 371 (c)(1),
(2) Date: Apr. 28, 2022

(87) PCT Pub. No.: WO2021/085067
PCT Pub. Date: May 6, 2021

(65) Prior Publication Data
US 2023/0033994 A1  Feb. 2, 2023

(30) Foreign Application Priority Data

Nov. 1, 2019  (JP) ................. 2019-199603

(51) Int. Cl.
*H04L 41/5074* (2022.01)
*H04L 41/5041* (2022.01)

(52) U.S. Cl.
CPC ...... *H04L 41/5074* (2013.01); *H04L 41/5041* (2013.01)

(58) Field of Classification Search
None
See application file for complete search history.

(56) References Cited

U.S. PATENT DOCUMENTS

| 10,447,786 B1 * | 10/2019 | Arnberg ................ H04W 12/35 |
| 2016/0065653 A1 | 3/2016 | Chen et al. |
| 2016/0328793 A1 | 11/2016 | Mano et al. |

(Continued)

FOREIGN PATENT DOCUMENTS

| JP | 2001-325388 A | 11/2001 |
| JP | 2003-22224 A | 1/2003 |

(Continued)

OTHER PUBLICATIONS

"Azure IoT Hub", Microsoft, total 25 pages, search Jun. 2, 2019, https://azure.microsoft.com/ja-jp/services/iot-hub/.

(Continued)

*Primary Examiner* — Mohamed Ibrahim
(74) *Attorney, Agent, or Firm* — XSENSUS LLP

(57) ABSTRACT

A support method, a support system, and a computer program for efficiently creating a new service obtained by combining functions of a plurality of devices are provided. A support method of the present invention is a support method of supporting creation of a new service obtained by combining functions of a plurality of devices via an IoT hub to which the plurality of devices are connected, and causes an information processing device to execute an extraction step, and the support method further includes a list output step, a selection reception step, a selection output step, an availability reception step, an input and output step, an answer reception step, and a transmission step.

5 Claims, 16 Drawing Sheets

(56) References Cited

U.S. PATENT DOCUMENTS

| | | | |
|---|---|---|---|
| 2017/0005820 A1* | 1/2017 | Zimmerman | H04L 67/10 |
| 2017/0171180 A1* | 6/2017 | Britt | G06F 16/9554 |
| 2019/0089603 A1* | 3/2019 | Harat | H04L 41/12 |
| 2020/0280491 A1* | 9/2020 | Riedl | H04L 41/22 |

FOREIGN PATENT DOCUMENTS

| | | |
|---|---|---|
| JP | 2016-71569 A | 5/2016 |
| WO | 2016/039012 A1 | 3/2016 |
| WO | 2017/119094 A1 | 7/2017 |
| WO | 2019/026635 A1 | 2/2019 |

OTHER PUBLICATIONS

"AWS IoT", Amazon Web Services, total 19 pages, search Jun. 2, 2019, https://aws.amazon_com/jp/iot/.

Office Action dated Jun. 29, 2021, in corresponding Taiwanese patent Application No. 1109136600, 10 pages.

International Search Report and Written Opinion of the International Searching Authority dated Dec. 28, 2020, corresponding PCT/JP20201038135, 10 pages.

International Search Report and Written Opinion dated Dec. 28, 2020, received for PCT Application PCT/JP2020/038135, Filed on Oct. 8, 2020, 8 pages including English Translation.

\* cited by examiner

FIG. 4

| COOPERATION ITEM MENU SHEET AND APPLICATION | | | | | |
|---|---|---|---|---|---|
| A | APPLICATION DESTINATION CONNECTION OPERATOR (To) | | | COMPANY A | |
| | (USER ID OF COMPANY C) | | | XXXXXXX | |
| B | COOPERATION APPLICATION (APPLICATION SOURCE) CONNECTION OPERATOR (From) | | | COMPANY B | |
| | (USER ID OF COMPANY C) | | | XXXXXXX | |
| DEVICE FORMAT | | | ELECTRONIC LOCK-XXX | | |
| ITEM NO | OPERATION AND ACQUISITION ITEM | OPERATION/ INFORMATION ACQUISITION | COMMAND NAME OR COMMAND CODE | <<A>> COOPERATION APPLICATION (○/x) | <<B>> PERMISSION DETERMINATION (Y/N) |
| 1 | LOCK | OPERATION | "lock" | | |
| 2 | LOCK | OPERATION | "unlock" | | |
| 3 | DOOR OPEN | INFORMATION ACQUISITION | "acs_door_opened" | | |
| 4 | DOOR CLOSE | INFORMATION ACQUISITION | "acs_door_closed" | | |
| 5 | DOOR HELD OPEN | INFORMATION ACQUISITION | "acs_door_held_open" | | |
| 6 | USER | INFORMATION ACQUISITION | "access_person_used" | | |
| 7 | BLANK | | | | |
| 8 | | | | | |
| 9 | | | | | |
| 10 | | | | | |
| - | PRESENCE/ABSENCE OF INDIVIDUAL DISCUSSION ITEM | | | | |

| COMPANY B: DETERMINATION RESULT ACCEPTANCE (FOLLOWING PROCEDURES 5 AND 6) | <A> : COOPERATION ACCORDING TO DETERMINATION RESULT<br><B> : APPLICATION CONTENT IS CHANGED AND RE-DISCUSSED<br><C> : DISCONTINUATION OF COOPERATION | |
|---|---|---|
| COOPERATION DISCUSSION PROCEDURE RECORD | CONTACT RECEIPT DATE OF COMPANY C | CONTACT ISSUE DATE FROM COMPANY C |
| 1) APPLICATION CONTENT IS DESCRIBED IN COMPANY B | FILL IN <<A>> FIELD | |
| 2) APPLICATION CONTENT IS NOTIFIED OF | B > C > A | |
| 3) PERMISSION DETERMINATION IN COMPANY A | FILL IN <<B>> FIELD | |
| 4) DETERMINATION RESULT IS NOTIFIED OF | A > C > B | |
| 5) DETERMINATION RESULT OF COMPANY A IS CONSIDERED IN COMPANY B | <A><B><C> | |
| 6) ACCEPTANCE OF RESULT IS NOTIFIED OF | B > C > A | |

FIG. 5

COOPERATION ITEM MENU SHEET AND APPLICATION — 140

| | | | |
|---|---|---|---|
| A | APPLICATION DESTINATION CONNECTION OPERATOR (To) | | COMPANY A |
| | (USER ID OF COMPANY C) | | XXXXXXX |
| B | COOPERATION APPLICATION (APPLICATION SOURCE) CONNECTION OPERATOR (From) | | COMPANY B |
| | (USER ID OF COMPANY C) | | XXXXXXX |
| DEVICE FORMAT | | | ELECTRONIC LOCK-XXX |

| ITEM NO | OPERATION AND ACQUISITION ITEM | OPERATION/ INFORMATION ACQUISITION | COMMAND NAME OR COMMAND CODE | <<A>> COOPERATION APPLICATION (○/x) | <<B>> PERMISSION DETERMINATION (Y/N) |
|---|---|---|---|---|---|
| 1 | LOCK | OPERATION | "lock" | ○ | |
| 2 | LOCK | OPERATION | "unlock" | ○ | |
| 3 | DOOR OPEN | INFORMATION ACQUISITION | "acs_door_opened" | ○ | |
| 4 | DOOR CLOSE | INFORMATION ACQUISITION | "acs_door_closed" | ○ | |
| 5 | DOOR HELD OPEN | INFORMATION ACQUISITION | "acs_door_held_open" | x | |
| 6 | USER | INFORMATION ACQUISITION | "access_person_used" | ○ | |
| 7 | BLANK | | | | |
| 8 | | | | | |
| 9 | | | | | |
| 10 | | | | | |
| - | PRESENCE/ABSENCE OF INDIVIDUAL DISCUSSION ITEM | | | ○ | |

| COMPANY B: DETERMINATION RESULT ACCEPTANCE (FOLLOWING PROCEDURES 5 AND 6) | <A> : COOPERATION ACCORDING TO DETERMINATION RESULT<br><B> : APPLICATION CONTENT IS CHANGED AND RE-DISCUSSED<br><C> : DISCONTINUATION OF COOPERATION | | |
|---|---|---|---|
| COOPERATION DISCUSSION PROCEDURE RECORD | | CONTACT RECEIPT DATE OF COMPANY C | CONTACT ISSUE DATE FROM COMPANY C |
| 1) APPLICATION CONTENT IS DESCRIBED IN COMPANY B | FILL IN <<A>> FIELD | | |
| 2) APPLICATION CONTENT IS NOTIFIED OF | B > C > A | | |
| 3) PERMISSION DETERMINATION IN COMPANY A | FILL IN <<B>> FIELD | | |
| 4) DETERMINATION RESULT IS NOTIFIED OF | A > C > B | | |
| 5) DETERMINATION RESULT OF COMPANY A IS CONSIDERED IN COMPANY B | <A><B><C> | | |
| 6) ACCEPTANCE OF RESULT IS NOTIFIED OF | B > C > A | | |

FIG. 6

| | | | | | 140 |
|---|---|---|---|---|---|
| COOPERATION ITEM MENU SHEET AND APPLICATION | | | | | |
| A | APPLICATION DESTINATION CONNECTION OPERATOR (To) | | | COMPANY A | |
| | (USER ID OF COMPANY C) | | | XXXXXXX | |
| B | COOPERATION APPLICATION (APPLICATION SOURCE) CONNECTION OPERATOR (From) | | | COMPANY B | |
| | (USER ID OF COMPANY C) | | | XXXXXXX | |
| DEVICE FORMAT | | | ELECTRONIC LOCK-XXX | | |
| ITEM NO | OPERATION AND ACQUISITION ITEM | OPERATION/ INFORMATION ACQUISITION | COMMAND NAME OR COMMAND CODE | <<A>> COOPERATION APPLICATION (o/x) | <<B>> PERMISSION DETERMINATION (Y/N) |
| 1 | LOCK | OPERATION | "lock" | o | Y |
| 2 | LOCK | OPERATION | "unlock" | o | Y |
| 3 | DOOR OPEN | INFORMATION ACQUISITION | "acs_door_opened" | o | Y |
| 4 | DOOR CLOSE | INFORMATION ACQUISITION | "acs_door_closed" | o | Y |
| 5 | DOOR HELD OPEN | INFORMATION ACQUISITION | "acs_door_held_open" | x | n/a |
| 6 | USER | INFORMATION ACQUISITION | "access_person_used" | o | N |
| 7 | BLANK | | | | |
| 8 | | | | | |
| 9 | | | | | |
| 10 | | | | | |
| - | PRESENCE/ABSENCE OF INDIVIDUAL DISCUSSION ITEM | | | o | - |
| COMPANY B: DETERMINATION RESULT ACCEPTANCE (FOLLOWING PROCEDURES 5 AND 6) | | <A> : COOPERATION ACCORDING TO DETERMINATION RESULT<br><B> : APPLICATION CONTENT IS CHANGED AND RE-DISCUSSED<br><C> : DISCONTINUATION OF COOPERATION | | | |
| COOPERATION DISCUSSION PROCEDURE RECORD | | | CONTACT RECEIPT DATE OF COMPANY C | | CONTACT ISSUE DATE FROM COMPANY C |
| 1) APPLICATION CONTENT IS DESCRIBED IN COMPANY B | | FILL IN <<A>> FIELD | | | |
| 2) APPLICATION CONTENT IS NOTIFIED OF | | B > C > A | | | |
| 3) PERMISSION DETERMINATION IN COMPANY A | | FILL IN <<B>> FIELD | | | |
| 4) DETERMINATION RESULT IS NOTIFIED OF | | A > C > B | | | |
| 5) DETERMINATION RESULT OF COMPANY A IS CONSIDERED IN COMPANY B | | <A><B><C> | | | |
| 6) ACCEPTANCE OF RESULT IS NOTIFIED OF | | B > C > A | | | |

SUPPORT METHOD, SUPPORT SYSTEM, AND COMPUTER PROGRAM

CROSS-REFERENCE TO RELATED APPLICATIONS

The present application is based on PCI filing PCT/JP2020/038135, filed Oct. 8, 2020, which claims the priority to Japanese Patent Application No. 2019-199603, filed on Nov. 1, 2019, the entire contents of each are incorporated herein by reference.

TECHNICAL FIELD

The present invention relates to a support method, a support system, and a computer program, and particularly, to a support method, a support system, and a computer program for supporting creation of a new service obtained by combining functions of a plurality of devices via an IoT hub to which the plurality of devices are connected.

BACKGROUND ART

In recent years, the number of devices that can connect to the Internet and receive various services has begun to increase. Such devices are called Internet of Things (IoT) devices.

Because each of these IoT devices is generally connected to a dedicated private cloud, IoT devices with different specifications manufactured by different manufacturers cannot usually connect to the same private cloud.

In recent years, an IoT cloud service called an IoT hub capable of connecting IoT devices from various manufacturers by publishing an application programming interface (API) for connection to a cloud or providing a software development kit (SDK), or the like has also been provided (Non Patent Literature 1, Non Patent Literature 2, and the like).

CITATION LIST

Non Patent Literature

[Non Patent Literature 1]
"Azure IoT Hub", Microsoft, [Retrieved on Jun. 2, 2019], Internet <https://azure.microsoft.com/ja-jp/serviceshot-hub/>
[Non Patent Literature 2]
"AWS IoT", Amazon Web Services, [Retrieved on Jun. 2, 2019], Internet <https://aws.amazon.com/jp/iot/>

SUMMARY OF INVENTION

Technical Problem

Although there are the IoT cloud services as described above, cooperation between respective services is limited, and a business operator for IoT devices needs to develop dedicated connection programs different between the respective services and incorporate the dedicated connection programs into a device.

The present inventors propose an idea regarding an IoT hub for freely interconnecting life IoT devices, which are in a silo state for each private cloud, via the Internet to provide attractive services.

Here, when creation of a new service obtained by combining functions of a plurality of devices is tried via an IoT hub to which the plurality of devices are connected, as an example, a service creator who is trying to create a service by combining a device of the own company with a device of another company needs to consider what functions of a device and of which company can be combined with a function of a device of the own company, apply for cooperation to a company of a target device, and obtain acceptance for cooperation.

With the spread of IoT devices in the future, the number of devices connected to an IoT hub will be enormous. In this case, there is concern that work of applying for and accepting cooperation will be a great burden on service creators, and hinder creation of new services.

Therefore, an object of the present invention is to provide a technical improvement that solves or alleviates at least some of the above-described problems of the related art. One of more specific objects of the present invention provide a support method, a support system, and a computer program for efficiently creating a new service obtained by combining functions of a plurality of devices.

Solution to Problem

A support method of the present invention is a support method of supporting creation of a new service obtained by combining functions of a plurality of devices via an IoT hub to which the plurality of devices are connected, the support method causing an information processing device to execute: an extraction step of extracting at least one device capable of realizing a function required by a first user from the plurality of devices connected to the IoT hub, or extracting at least one device on the basis of a designation from the first user, and the support method further includes a list output step of outputting a list of operation items of the device extracted in the extraction step so that the first user is able to check the list; a selection reception step of receiving an input of a selection of at least one operation item by the first user from the list of operation items output in the list output step; a selection output step of outputting the at least one operation item selected by the first user so that a second user, the second user being an administrator of the device extracted in the extraction step, is able to check the operation item, on the basis of the input received in the selection reception step; an availability reception step of receiving an input of availability by the second user with respect to the selection output in the selection output step; an input and output step of outputting the input received in the availability reception step so that the first user is able to check the input; an answer reception step of receiving an input of one answer by the first user from among a plurality of options of answers to the input output in the input and output step; and a transmission step of outputting the answer received in the answer reception step so that the second user is able to check the answer.

The list output step can be a step in which the information processing device outputs the list of operation items of the device extracted in the extraction step to the first user terminal that can be checked by the first user.

The selection reception step can be a step in which the information processing device receives the input of the selection of at least one operation item by the first user from the list of operation items output in the list output step from the first user terminal.

The input and output step can be a step in which the information processing device outputs the input received in the availability reception step to the first user terminal that can be checked by the first user.

The answer reception step can be a step in which the information processing device receives an input of one answer by the first user from the plurality of options of answers to the input output in the input and output step via the first user terminal.

The selection output step can be a step in which the information processing device outputs at least one operation item selected by the first user to a second user terminal that can be checked by a second user who is the administrator of the device extracted in the extraction step on the basis of the input received in the selection reception step.

The availability reception step can be a step in which the information processing device receives the input of availability by the second user with respect to the selection output in the selection output step from the second user terminal.

The transmission step can be a step in which the information processing device outputs the answer received in the answer reception step to the second user terminal that can be checked by the second user.

A support system of the present invention is a support system for supporting creation of a new service obtained by combining functions of a plurality of devices via an IoT hub to which the plurality of devices are connected, the support system including an information processing device, wherein the information processing device includes an extraction unit configured to extract at least one device capable of realizing a function required by a first user from the plurality of devices connected to the IoT hub, or extract the at least one device on the basis of a designation from the first user; a list output unit configured to output a list of operation items of the device extracted in the extraction unit so that the first user is able to check the list; a selection reception unit configured to receive an input of a selection of at least one operation item by the first user from the list of operation items output in the list output unit; a selection output unit configured to output the at least one operation item selected by the first user so that a second user, the second user being an administrator of the device extracted in the extraction unit, is able to check the operation item, on the basis of the input received in the selection reception unit; an availability reception unit configured to receive an input of availability by the second user with respect to the selection output in the selection output unit; an input and output unit configured to output the input received in the availability reception unit so that the first user is able to check the input; an answer reception unit configured to receive an input of one answer by the first user from among a plurality of options of answers to the input output in the input and output unit; and a transmission unit configured to output the answer received in the answer reception unit so that the second user is able to check the answer.

A computer program of the present invention is a computer program for supporting creation of a new service obtained by combining functions of a plurality of devices via an IoT hub to which the plurality of devices are connected, the computer program causing an information processing device to execute: an extraction function of extracting at least one device capable of realizing a function required by a first user from the plurality of devices connected to the IoT hub, or extracting the at least one device on the basis of a designation from the first user; a list output function of outputting a list of operation items of the device extracted by the extraction function so that the first user is able to check the list; a selection reception function of receiving an input of a selection of at least one operation item by the first user from the list of operation items output by the list output function; a selection output function of outputting the at least one operation item selected by the first user so that a second user, the second user being an administrator of the device extracted by the extraction function, is able to check the operation item, on the basis of the input received by the selection reception function; an availability reception function of receiving an input of availability by the second user with respect to the selection output by the selection output function; an input and output function of outputting the input received by the availability reception function so that the first user is able to check the input; an answer reception function of receiving an input of one answer by the first user from among a plurality of options of answers to the input output by the input and output function; and a transmission function of outputting the answer received by the answer reception function so that the second user is able to check the answer.

Advantageous Effects of Invention

According to the present invention, it is possible to provide a technical improvement that solves or alleviates at least some of the above-described problems of the related art. Further, according to the present invention, it becomes possible to efficiently create a new service obtained by combining functions of a plurality of devices.

BRIEF DESCRIPTION OF DRAWINGS

FIG. 4 is a conceptual diagram illustrating an example of a menu sheet according to the embodiment of the present invention.

FIG. 5 is a conceptual diagram illustrating an example of a menu sheet according to the embodiment of the present invention.

FIG. 6 is a conceptual diagram illustrating an example of the menu sheet according to the embodiment of the present invention.

DESCRIPTION OF EMBODIMENTS

Hereinafter, embodiments of the present invention will be described with reference to the drawings.

First, an embodiment of a support method of the present invention will be described.

The support method of the present invention is a support method of supporting creation of a new service obtained by combining functions of a plurality of devices via an IoT hub to which the plurality of devices are connected.

Figure 1:
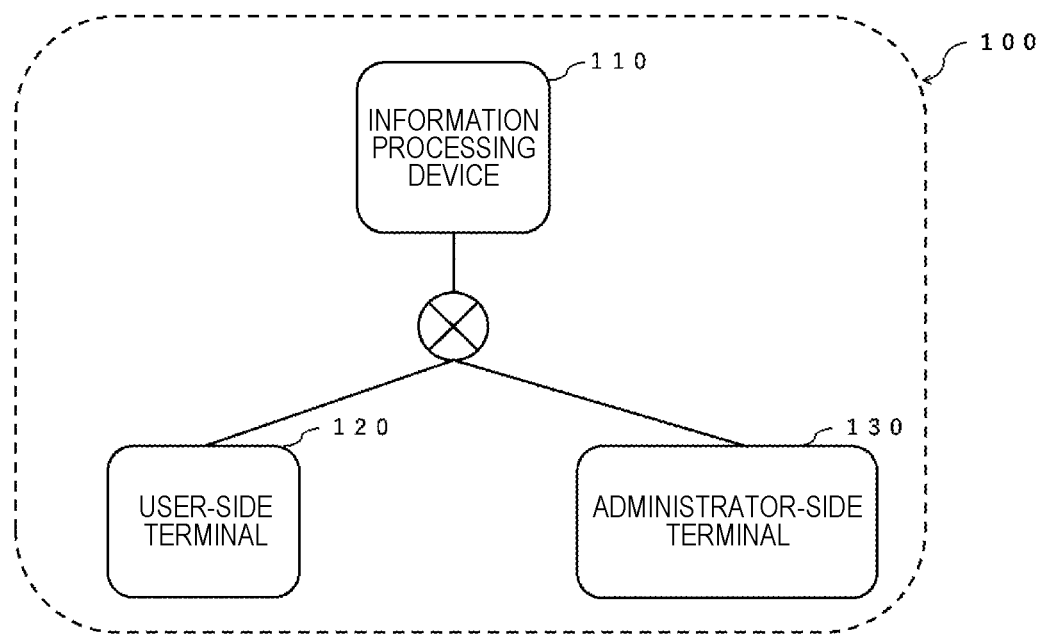
FIG. 1 is a system configuration diagram illustrating an example of a configuration of a support system according to an embodiment of the present invention.

The support method is executed in a support system illustrated in FIG. 1. A support system 100 illustrated in FIG. 1 can include an information processing device 110, a user-side terminal 120, and an administrator-side terminal 130.

<Hardware Configuration>

Figure 2:
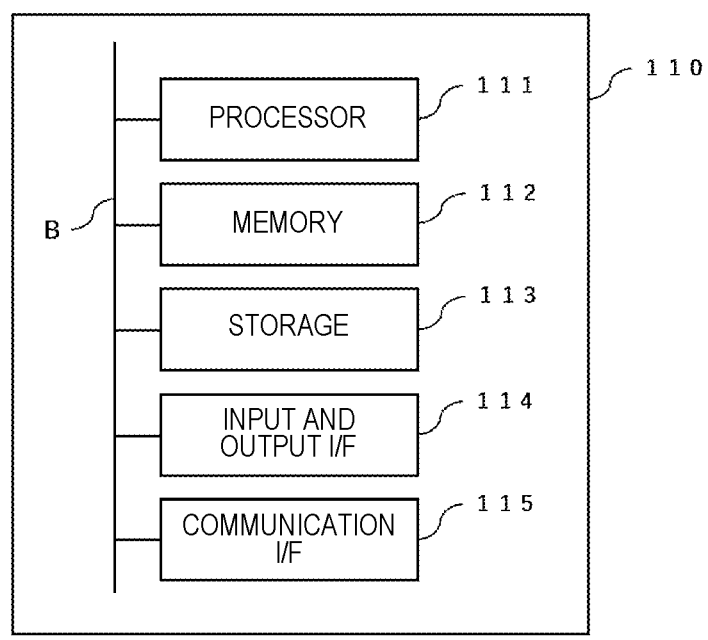
FIG. 2 is a configuration diagram illustrating an example of a hardware configuration of an information processing device according to an embodiment of the present invention.

Here, a hardware configuration of the information processing device 110 included in the support system 100 will be described with reference to FIG. 2. The information processing device 110 includes a processor 111, a memory 112, a storage 113, an input and output interface (input and output I/F) 114, and a communication interface (communication I/F) 115. The respective components are connected to each other via a bus B.

The information processing device 110 can realize functions and a method described in the embodiment through cooperation of the processor 111, the memory 112, the storage 113, the input and output I/F 114, and the communication I/F 115.

The processor 111 executes functions and/or methods that are realized by a code or an instruction included in a program stored in the storage 113. The processor 111 includes, for example, a central processing unit (CPU), a micro processing unit (MPU), a graphics processing unit (GPU), a microprocessor, a processor core, a multiprocessor, an application-specific integrated circuit (ASIC), or a field programmable gate array (FPGA), and each process disclosed in each embodiment can be realized by a logic circuit (hardware) or a dedicated circuit formed of an integrated circuit (an integrated circuit (IC) chip or a large scale integration (LSI)). Further, these circuits may be realized by one or a plurality of integrated circuits, and a plurality of processes illustrated in each embodiment may be realized by one integrated circuit. Further, an LSI may also be referred to as a VLSI, a super LSI, an ultra LSI, or the like according to a degree of integration.

The memory 112 temporarily stores a program loaded from the storage 113 and provides a work area to the processor 111. Various types of data that are generated while the processor 111 is executing the program are also temporarily stored in the memory 112. The memory 112 includes, for example, a random access memory (RAM) and a read only memory (ROM).

The storage 113 stores the program. The storage 113 includes, for example, a hard disk drive (HDD), a solid state drive (SSD), and a flash memory.

The communication I/F 115 is implemented as hardware such as a network adapter, communication software, and a combination thereof, and transmits/receives various types of data via the network. The communication may be executed by wire or wirelessly, and any communication protocol may be used as long as mutual communication can be executed. The communication I/F 115 executes communication with other information processing devices via a network. The communication I/F 115 transmits various types of data to other information processing devices according to an instruction from the processor 111. Further, the communication I/F 115 receives various types of data transmitted from other information processing devices and transfers the data to the processor 111.

The input and output I/F 114 includes an input device that inputs various operations with respect to the information processing device 110, and an output device that outputs a processing result of the information processing device 110. In the input and output I/F 114, the input device and the output device may be integrated or the input and output I/F 114 may be separated into the input device and the output device.

The input device is realized by any one of all types of devices capable of receiving an input from a user and transferring information related to the input to the processor 111, or a combination thereof. The input device includes, for example, a hardware keys such as those on a touch panel, a touch display, and a keyboard, a pointing device such as a mouse, a camera (an operation is input through an image), and a microphone (an operation is input by vocal sound).

The output device outputs a processing result of the processor 111. The output device includes, for example, a touch panel or a speaker. The information processing device 110, the user-side terminal 120, and the administrator-side terminal 130 can also be configured with the same hardware configuration as in FIG. 2, unless otherwise noted.

Hereinafter, description will be given in which a connection provider (company B) that applies for cooperation is a first user, a connection provider (company A) to which the first user applies for the cooperation is a second user, and a business operator (company C) that mediates between the first user and the second user is a third user.

As an example, it is assumed that the first user is a user who provides a face recognition device, and the second user is a user who provides an electronic lock device.

The first user is a person who causes a face authentication function that is a function of the face recognition device to cooperate with a door lock opening and closing function that is a function of the electronic lock device, and tries to create a service of unlocking a door when the unlocking is permitted by the face authentication function.

Figure 3:
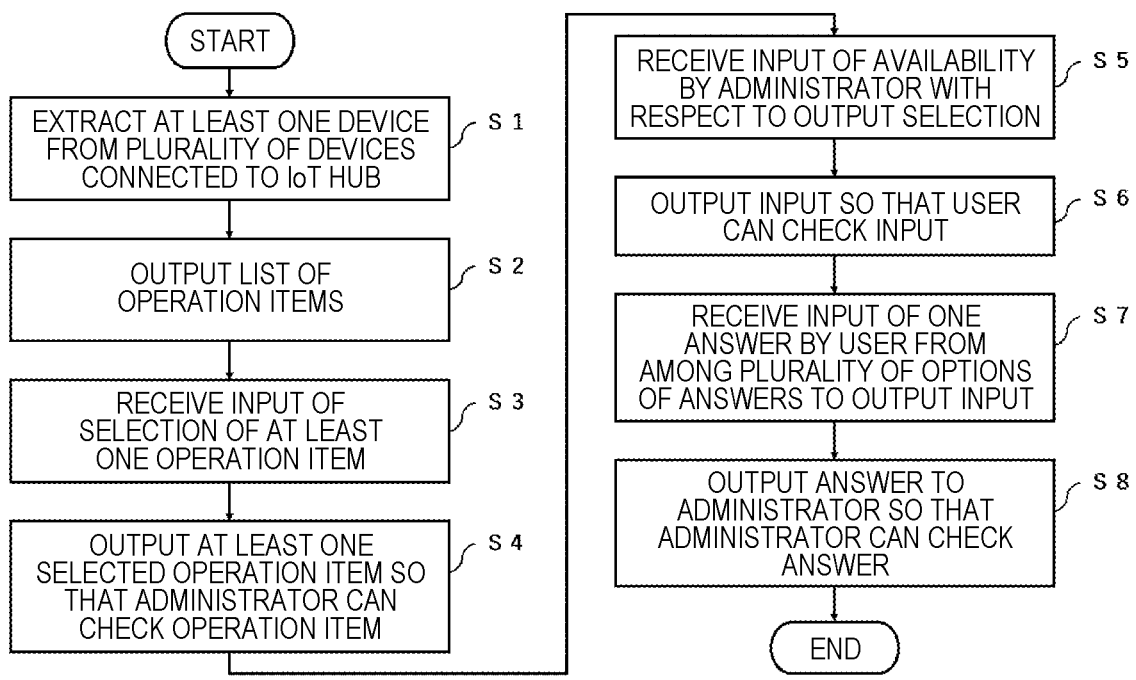
FIG. 3 is a flowchart illustrating an example of a flow of a support method according to the embodiment of the present invention.

Here, in the support method of the present invention, the information processing device 110 is caused to execute an extraction step S1, as illustrated in FIG. 3.

In extraction step S1, at least one device capable of realizing a function required by the user (the first user) from a plurality of devices connected to the IoT hub is extracted.

For example, when the function required by the first user is a function of opening and closing the door lock, a device having such a function, such as an electronic lock device of the second user, is extracted. A plurality of devices may be extracted as devices having a door lock opening and closing function.

In order to perform the above extraction, a database regarding device information is stored in a storage device included in the information processing device 110 or connected to the information processing device 110.

In the above database, it is assumed that information such as device ID, name, function, and provider are associated with each other as the device information. The information included in the device information is not limited to these, and various types of information can be associated as the device information.

Further, an input of a function requested by the first user may be selected from among function items that can be provided, which are prepared in advance. Such functional items can be automatically generated on the basis of the above database.

Alternatively, in the extraction step S1, at least one device is extracted from the plurality of devices connected to the IoT hub on the basis of a designation from the user.

The above configuration is effective in a case in which the first user specifies a device to be desired to cooperate with in advance.

The support method of the present invention further includes a list output step S2, a selection reception step S3, a selection output step S4, an availability reception step S5, an input and output step S6, an answer reception step S7, and a transmission step S8, as illustrated in FIG. 3.

In the list output step S2, a list of operation items of the device extracted in the extraction step S1 is output so that the user can check the list.

FIG. 4 illustrates an image of a cooperation item menu sheet and application form 140 (hereinafter referred to as a "menu sheet 140") including the list of operation items. Although such a menu sheet 140 is output to the user-side terminal 120 that can be checked by the user and displayed on the display screen of the user-side terminal 120, the menu sheet 140 can also be output to a paper medium and used. In FIG. 3, the first user is shown as company B, the second user is shown as company A, and the third user is shown as company C.

In FIG. 3, the list of operation items is described in an "operation and acquisition item" field. An "acquired item" is included in the operation item in the present invention as an operation of acquiring information.

Further, in relation to the operation item, whether such an item is related to an "operation" or "information acquisition" is also described. Further, a "command name" or "command code" required at the time of cooperation may also be described in advance.

In the selection reception step S3, an input of a user's selection of at least one operation item from the list of operation items output in the list output step S2 is received.

As an example, the user inputs "○" or "×" in a cooperation application field in the menu sheet 140, as illustrated in FIG. 4. Such an input can be performed by an operation with respect to the user-side terminal 120, or can be performed by writing to the output paper medium. In the latter case, a selection written to the paper medium is preferably input to the information processing device 110 by a third user.

In the selection output step S4, at least one operation item selected by the user is output so that an administrator of the device extracted in the extraction step can check the operation item, on the basis of the input received in the selection reception step S3.

Although, as an example, the menu sheet 140 in which the cooperation application field has been filled, which is illustrated in FIG. 4, is output to an administrator-side terminal 130 that can be checked by the administrator, and is displayed on the display screen of the administrator-side terminal 130, the menu sheet 140 can be output to a paper medium and used.

In the availability reception step S5, an input of availability by the administrator with respect to the selection output in the selection output step S4 is received.

As an example, as illustrated in FIG. 5, the administrator inputs "Y (YES)", "N (NO)", or "n/a (not available)" in a permission determination field of the menu sheet 140. Such an input can be performed by an operation with respect to the administrator-side terminal 130, or can also be performed by writing to an output paper medium. In the latter case, a selection written to the paper medium is preferably input to the information processing device 110 by a third user.

In the input and output step S6, the input received in the availability reception step S5 is output so that the user can check the input.

Although, as an example, the menu sheet 140 in which the permission determination field has been filled, which is illustrated in FIG. 5, is output to the user-side terminal 120 that can be checked by the user and displayed on the display screen of the user-side terminal 120, the menu sheet 140 can also be output to a paper medium and used.

The answer reception step S7 includes receiving an input of one answer by the user from among a plurality of options of answers to the input output in the input and output step S6.

As an example, the user selects an answer from "<A>: Cooperation according to a determination result", "<B>: Re-discussion by changing application content", or "<C>: Discussion discontinuation". An input of such a selection can be performed by an operation with respect to the user-side terminal 120, or can be performed by writing to the output paper medium. In this case, the selection written to the paper medium is preferably input to the information processing device 110 by a third user.

The transmission step S8 includes outputting the answer received in the answer reception step S7 to the administrator so that the administrator can check the answer.

Although, as an example, the menu sheet 140 in which the answer has been filled, which is illustrated in FIG. 6, is output to the administrator-side terminal 130 that can be checked by the administrator, and is displayed on the display screen of the administrator-side terminal 130, the menu sheet 140 can be output to a paper medium and used.

According to the above configuration, it is possible to provide a technical improvement that solves or alleviates at least some of the above-described problems of the related art. Further, according to the above configuration, it becomes possible to efficiently create a new service obtained by combining functions of a plurality of devices.

Further, in the extraction step S1, the at least one device capable of realizing the function required by the user (the first user) is automatically extracted from the plurality of devices connected to the IoT hub, so that a load on a work of extracting a device that is a cooperation destination can be reduced, and new services can be created efficiently.

Further, the information processing device (third user) mediates the menu sheet so that a work load related to a contract can be reduced, and new services can be efficiently created.

Further, as the embodiment of the present invention, in the list output step S2, the information processing device may output the list of operation items of the device extracted in the extraction step to a user-side terminal that enables the user to check the list, as described above.

Further, in the selection reception step S3, the information processing device 110 may receive the input of the user's selection of at least one operation item from the list of operation items output in the list output step S2 from the user-side terminal 120.

Further, in the input and output step S6, the information processing device 110 may output the input received in the availability reception step S5 to the user-side terminal 120 that enables the user to check the input.

Further, in the answer reception step S7, the information processing device 110 may receive an input of one answer by the user from the plurality of options of answers to the input output in the input and output step S6 via the user-side terminal 120.

Further, in the selection output step S4, the information processing device 110 may output at least one operation item selected by the user to the administrator-side terminal 130 that can be checked by an administrator of the device extracted in the extraction step S1, on the basis of the input received in the selection reception step S3.

Further, in the availability reception step S5, the information processing device 110 may receive the input of availability by the administrator with respect to the selection output in the selection output step S4 from the administrator-side terminal 130.

Further, in the transmission step S8, the information processing device 110 may output the answer received in the answer reception step S7 to the administrator-side terminal 130 that can be checked by the administrator.

According to the above configuration, it is possible to provide a technical improvement that solves or alleviates at least some of the above-described problems of the related art. Further, according to the above configuration, it becomes possible to efficiently create a new service obtained by combining functions of a plurality of devices.

Subsequently, the support system 100 according to the embodiment of the present invention will be described.

The support system 100 of the present invention is a support system 100 that supports creation of a new service obtained by combining functions of a plurality of devices via an IoT hub to which the plurality of devices are connected, and includes the information processing device 110, as illustrated in FIG. 1.

Figure 7:
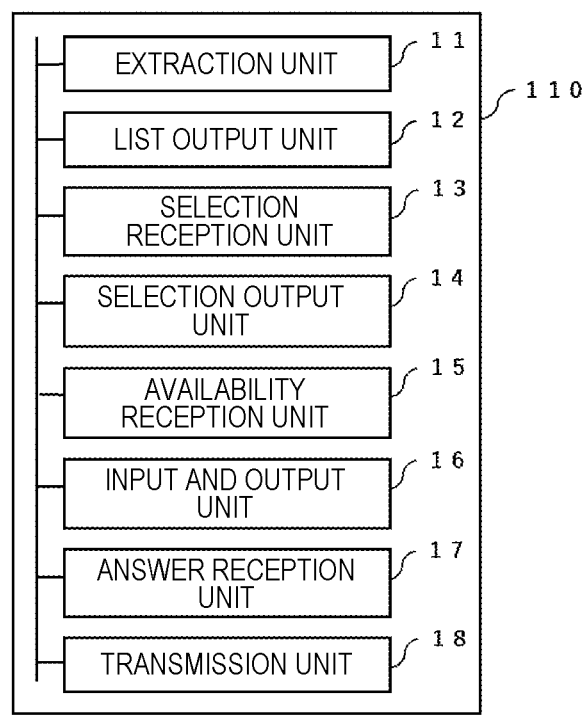
FIG. 7 is a configuration diagram illustrating an example of a functional configuration of an information processing device according to the embodiment of the present invention.

The information processing device 110 includes an extraction unit 11, a list output unit 12, a selection reception unit 13, a selection output unit 14, an availability reception unit 15, an input and output unit 16, an answer reception unit 17, and a transmission unit 18, as illustrated in FIG. 7.

The extraction unit 11 extracts at least one device capable of realizing the function required by the first user from the plurality of devices connected to the IoT hub, or extracts the at least one device on the basis of a designation from the first user. Such processing can be executed in the extraction step S1 described above.

The list output unit 12 outputs a list of operation items of the device extracted by the extraction unit 11 so that the first user can check the list. Such processing can be executed in the list output step S2 described above.

The selection reception unit 13 receives an input for selection of at least one operation item by the first user from the list of operation items output by the list output unit 12. Such processing can be executed in the selection reception step S3 described above.

The selection output unit 14 outputs at least one operation item selected by the first user so that a second device administrator who is an administrator of the device extracted by the extraction unit 11 can check the operation item on the basis of the input received by the selection reception unit 13. Such processing can be executed in the above-described selection output step S4.

The availability reception unit 15 receives an input of availability by the second user with respect to the selection output by the selection output unit 14. Such processing can be executed in the availability reception step S5 described above.

The input and output unit 16 outputs the input received by the availability reception unit 15 so that the first user can check the input. Such processing can be executed in the availability reception step S described above.

The answer reception unit 17 receives an input of one answer by the first user from among the plurality of options of answers to the input output by the input and output unit 16. Such processing can be executed in the answer reception step 7 described above.

The transmission unit 18 outputs the answer received by the answer reception unit 17 so that the second user can check answer. Such processing can be executed in the transmission step S8 described above.

According to the above configuration, it is possible to provide a technical improvement that solves or alleviates at least some of the above-described problems of the related art. Further, according to the present invention, it becomes possible to efficiently create a new service obtained by combining functions of a plurality of devices.

Subsequently, a computer program according to the embodiment of the present invention will be described.

The computer program of the present invention is a computer program that supports creation of a new service obtained by combining functions of a plurality of devices via an IoT hub to which the plurality of devices are connected, and causes the information processing device 110 to execute an extraction function, a list output function, a selection reception function, a selection output function, an availability reception function, an input and output function, an answer reception function, and a transmission function.

The extraction function includes extracting at least one device capable of realizing the function required by the first user from the plurality of devices connected to the IoT hub, or extracting the at least one device on the basis of a designation from the first user.

The list output function outputs a list of operation items of the device extracted by the extraction function so that the first user can check the list.

The selection reception function receives an input for selection of at least one operation item by the first user from the list of operation items output by the list output function.

The selection output function outputs at least one operation item selected by the first user so that a second device administrator who is an administrator of the device extracted by the extraction function can check the operation item on the basis of the input received by the selection reception function.

The availability reception function receives an input of availability by the second user for the selection output by the selection output function.

The input and output function outputs the input received by the availability reception function so that the first user can check the input.

The answer reception function receives an input of one answer by the first user from the plurality of options of answers to the input output by the input and output function.

The transmission function outputs the answer received by the answer reception function so that the second user can check the answer.

Figure 8:
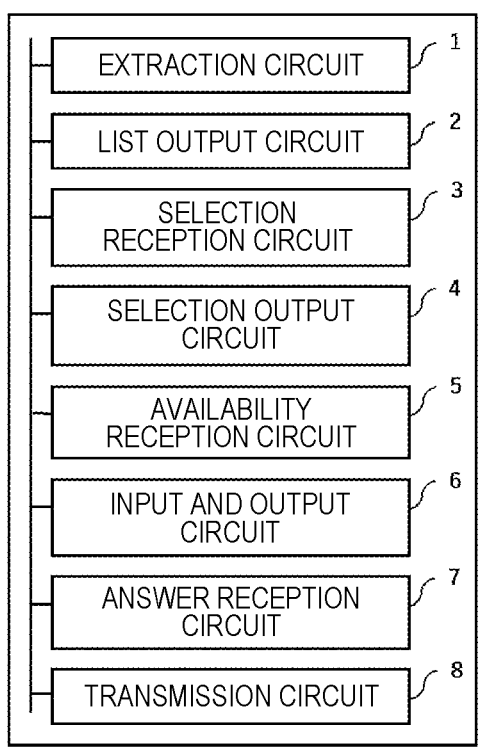
FIG. 8 is a circuit configuration diagram illustrating an example of a circuit configuration of the information processing device according to an embodiment of the present invention.

The above functions are realized by an extraction circuit 1, a list output circuit 2, a selection reception circuit 3, a selection output circuit 4, an availability reception circuit 5, an input and output circuit 6, an answer reception circuit 7, and a transmission circuit 8 illustrated in FIG. 8. Details of the respective units are as described above.

According to the above configuration, it is possible to provide a technical improvement that solves or alleviates at least some of the above-described problems of the related art. Further, according to the present invention, it becomes possible to efficiently create a new service obtained by combining functions of a plurality of devices.

Finally, an example of an IoT connection system 1000 including the IoT hub according to the embodiment of the present invention will be described with reference to the drawings.

Figure 9:
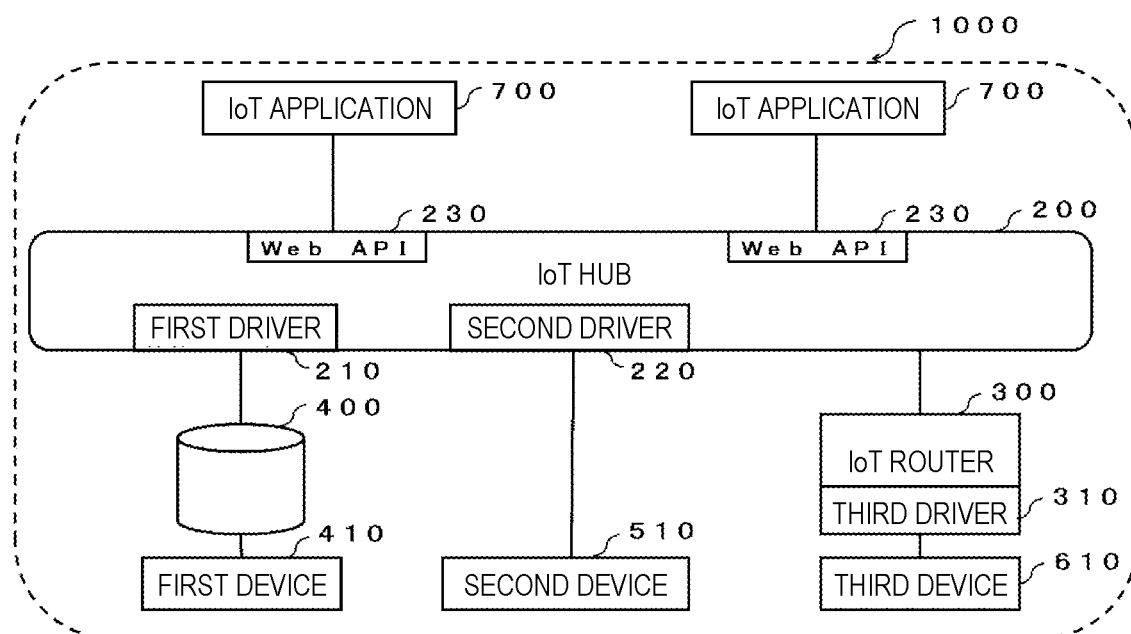
FIG. 9 is a system configuration diagram illustrating an example of a configuration of an IoT connection system including an IoT hub according to an embodiment of the present invention.

As illustrated in FIG. 9, the IoT connection system 1000 of the present invention includes an IoT hub 200 and an IoT router 300.

The IoT hub 200 is realized on a cloud. Specifically, the IoT hub 200 is a managed service hosted in the cloud and functions as a repeater for bidirectional communication between an IoT application (hereinafter referred to as "IoT application") and the IoT device.

It is assumed that the IoT router 300 is located locally and is connected to the IoT hub 200 by a wide area network (WAN).

Specifically, the IoT router 300 realizes that an IoT device that is not connected to the Internet, such as a home network, is connected to the IoT hub 200.

The IoT hub 200 includes a first driver 210 and a second driver 220.

The first driver 210 and the second driver 220 absorb a difference in specification between respective IoT device manufacturers.

The first driver 210 connects the private cloud 400, to which the first device 410 can connect, to the IoT hub 200.

As an example, it is preferable that the first device 410 and the private cloud 400 are connected by a local area network (LAN), and the private cloud 400 and the first driver 210 are connected by a WAN.

The private cloud 400 is provided by a business operator of the first device 410. Although FIG. 1 illustrates a case in which the number of private clouds 400 is one, the number of private clouds 400 is not limited to one, and a plurality of private clouds 400 can be connected to the IoT hub 200. Further, the IoT hub 200 may include a plurality of first drivers 210.

Figure 10:
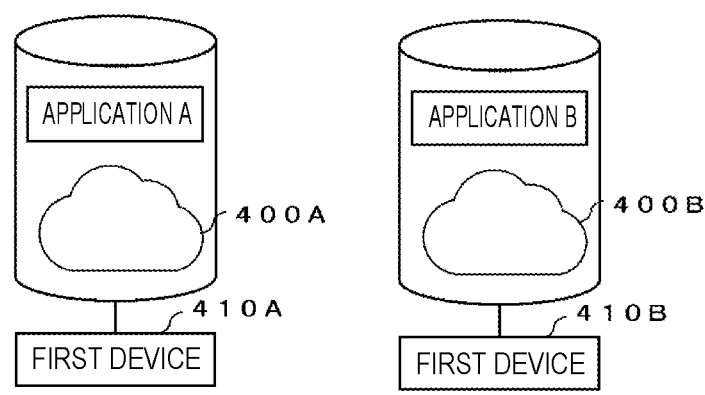
FIG. 10 is an image diagram illustrating an example of a plurality of private clouds of the IoT connection system according to the embodiment of the present invention.

FIG. 10 illustrates details of two private clouds 400A and 400B provided by different business operators A and B. As illustrated in FIG. 10, the private cloud 400A is connected to an application A provided by the business operator A (hereinafter referred to as an "application A"), and provides a service by the application A to the first device 410.

Similarly, the private cloud 400B is connected to as an application B provided by the business operator B (hereinafter referred to as an "application B"), and provides a service by the application B to the first device 410.

Figure 11:
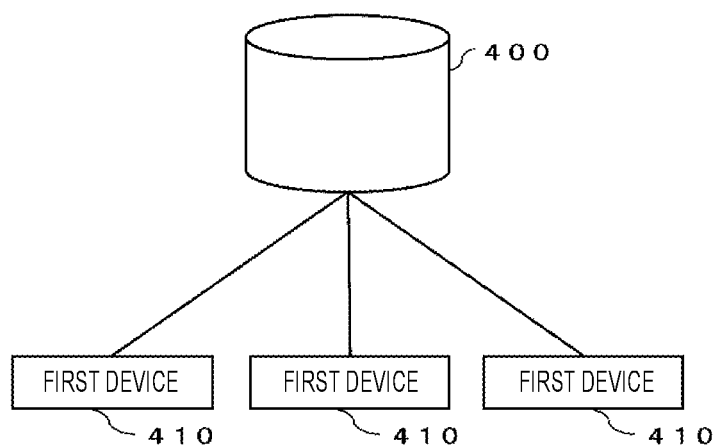
FIG. 11 is an image diagram illustrating an example of a plurality of first devices that are connected to a private cloud of the IoT connection system according to the embodiment of the present invention.

Although FIGS. 9 and 10 illustrate an example in which only one first device 410 is connected to the private cloud 400, a plurality of first devices 410 may be connected to one private cloud 400, as illustrated in FIG. 11.

The first device 410 can be a device to which the business operator provides a private cloud. Examples of the device include an electronic lock having a remote lock function, an AI speaker, and a nursing bed capable of a remote operation, but the present invention is not limited thereto.

The second driver 220 directly connects a second device 510 and the IoT hub 200.

As an example, it is preferable that the second device 510 and the second driver 220 are connected by a LAN.

Although FIG. 9 illustrates an example in which only one second device 510 is connected to the second driver 220, a plurality of second devices 510 may be connected to one second driver 220. Further, the IoT hub 200 may include a plurality of second drivers 220.

The second device 510 can be a device to which the business operator does not provide a private cloud. As an example, a fan, an air conditioner, a window, a curtain, a lighting, and the like can be used, but the present invention is not particularly limited thereto.

The IoT router 300 includes a third driver 310. Further, the IoT router 300 may include a plurality of third drivers 310.

The third driver 310 connects the third device 610 and the IoT router 300.

As an example, it is preferable that the third device 610 and the third driver 310 are connected by LAN, and the IoT router 300 and the IoT hub 200 are connected by WAN.

The third device 610 can be an IoT device that is not connected to the Internet, such as a home network, as described above. Further, the third device 610 can be a device that should not be directly connected to the IoT hub 200 from the viewpoint of security, privacy, and safety. As an example, a gas stove, a face recognition device, a data logger for collection of sensor information, and the like can be used, but the present invention is not limited thereto.

Thus, the IoT connection system 1000 of the present invention is a hybrid type of IoT connection system in which not all devices are directly connected to the IoT hub 200 on the cloud, but some of the devices are connected to the locally existing IoT router 300.

According to the above, not only directly connected IoT devices but also IoT devices connected to a private cloud of the related art can be easily interconnected.

This makes it possible to easily interconnect IoT devices of various manufacturers, unlike the related art in which only IoT devices of a determined manufacturer are connected to each other. Further, interconnecting IoT devices of various manufacturers makes it possible to create unique services that have never existed before.

Figure 12:
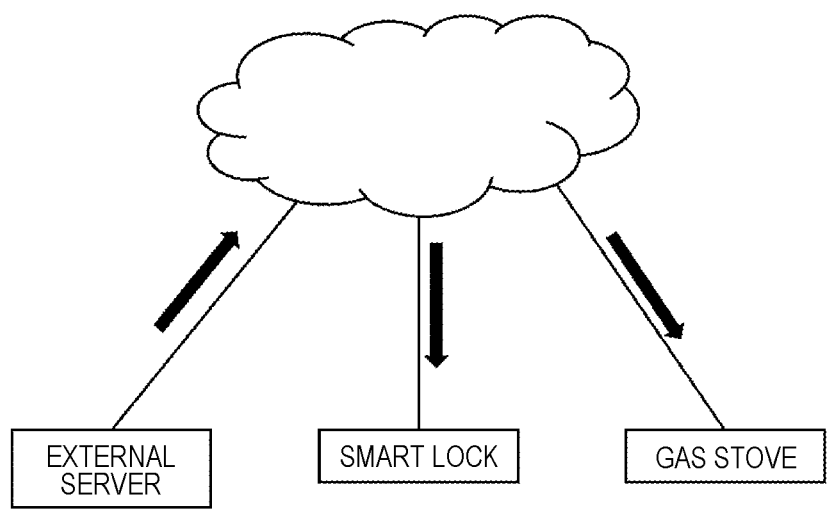
FIG. 12 is an image diagram illustrating an example of a flow of a service that is provided by the IoT connection system according to the embodiment of the present invention.

For example, according to the IoT connection system 1000 of the present invention, it is also easily possible to realize a service for sending a fire extinguishing signal to a gas stove to unlock a front door when an earthquake early warning is received from an external server, as illustrated in FIG. 12.

In the IoT connection system 1000 of the present invention, information that the user should describe in order to create the first driver 210, the second driver 220, and the third driver 310 is characterized in that the information is limited to information on a device definition and a command definition.

Here, a method of creating the first driver 210, the second driver 220, and the third driver 310 will be described. A creator can be a user related to manufacture and development of an IoT device, or a user related to provision of the IoT connection system of the present invention.

For the first driver 210, the second driver 220, and the third driver 310, information with the same content only need to be described, and programming languages may differ.

First, the creator defines a list of devices to be used as the device definition. As an example, when "weather sensor", "indoor sensor", "outdoor sensor", "suspicious person sensor", "approval sensor", and "power sensor" are defined as devices to be used, "weather", "inhouse", "outdoor", "security", "approve", and "power" serving as names and IDs thereof are described.

Subsequently, the creator defines available commands as the command definition. As an example, when an available command of "outdoor sensor" is defined, an observation command of a sensor value is described. The observation command can be, for example, "observation", "get", and "observe outdoors".

The creator can complete the first driver 210, the second driver 220, and the third driver 310 by embedding information on the device definition and the command definition in a program in a fill-in-the-blank format. Other parts can be provided from the provider as an SDK.

The SDK part includes a part related to device operation processing in a received command, a part related to preprocessing of collected sensor data/operation result data, and a part related to data transmission processing to the IoT hub.

According to the above configuration, because drivers for various forms of IoT devices can be easily completed, it becomes possible to realize an IoT connection system that can flexibly and easily connect IoT devices.

Normally, engineers involved in device development are in a different field of technology from Web development engineers, and many engineers do not have a technical level to connect devices to an IoT hub.

Therefore, it is very useful to be able to create any program for a driver using a common simple scheme in a fill-in-the-blank format, as in the present invention. This makes it possible to curb a development cost or development period related to the connection of the IoT device to the IoT hub, as compared with the related art.

Further, the reduction of development cost makes it possible to realize a connection to the IoT hub equally even when there is a difference in allowable value of a cost to be applied as in a fan and an air conditioner.

Subsequently, the connection between the IoT hub 200 and the IoT application according to the IoT connection system 1000 of the present invention will be described.

As illustrated in FIG. 9, the IoT hub 200 can include a Web API 230 for using an IoT application 700. As illustrated in FIG. 9, the IoT application 700 can connect as many as the number of services, and each IoT application can connect using the Web API 230.

The IoT application 700 is created by describing a data acquisition logic from an IoT device (sensor) and/or an operation logic of the IoT device in the application.

The data acquisition logic is configured of a part that preprocesses acquired sensor data, and a part that performs transmission to an API of the IoT hub 200. Required information is a connection destination URL provided by an operator of the IoT connection system 1000, an API key provided by the operator, device information, and an execution command.

The operation logic of the device is configured of a part that preprocesses a device command to be operated, and a part that performs transmission to the API of the IoT hub 200. Required information is a connection destination URL provided by an operator of the IoT connection system 1000, an API key provided by the operator, device information, and an execution command.

Figure 13:
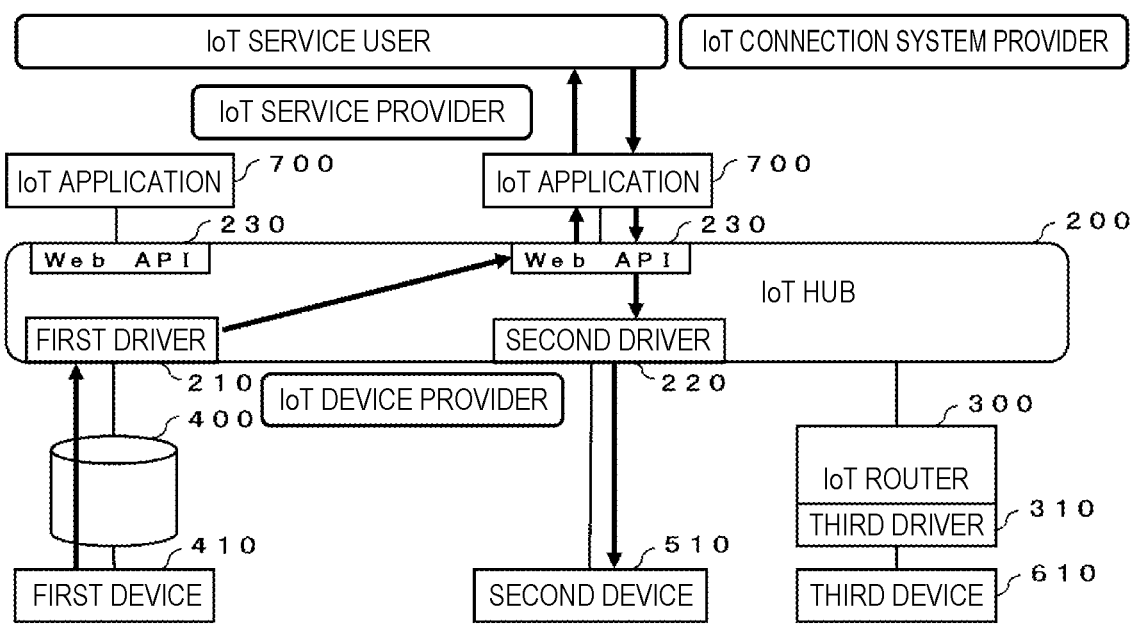
FIG. 13 is an image diagram illustrating an example of a flow of service that is provided by the IoT connection system according to the embodiment of the present invention.

FIG. 13 is a diagram illustrating a flow in which an IoT service user (an end user) receives provision of an IoT service from an IoT service provider using an IoT device provided by the IoT device provider. As illustrated in FIG. 13, when an event is first notified of from the first device 410, the end user is notified of the event via the private cloud 400, the first driver 210, the Web API 230, and the IoT application 700.

Subsequently, when the end user determines an action, the second device 510 is instructed to execute the action via the IoT application 700, the Web API 230, and the second driver 220.

The cooperation of IoT devices can be represented by an event-driven program such as "If ~ becomes like this, oo is done." This processing is made into a component as a microservice, made in common, and allowed to be used, and then, can be implemented as a function of function as a service (FaaS).

Figure 14:
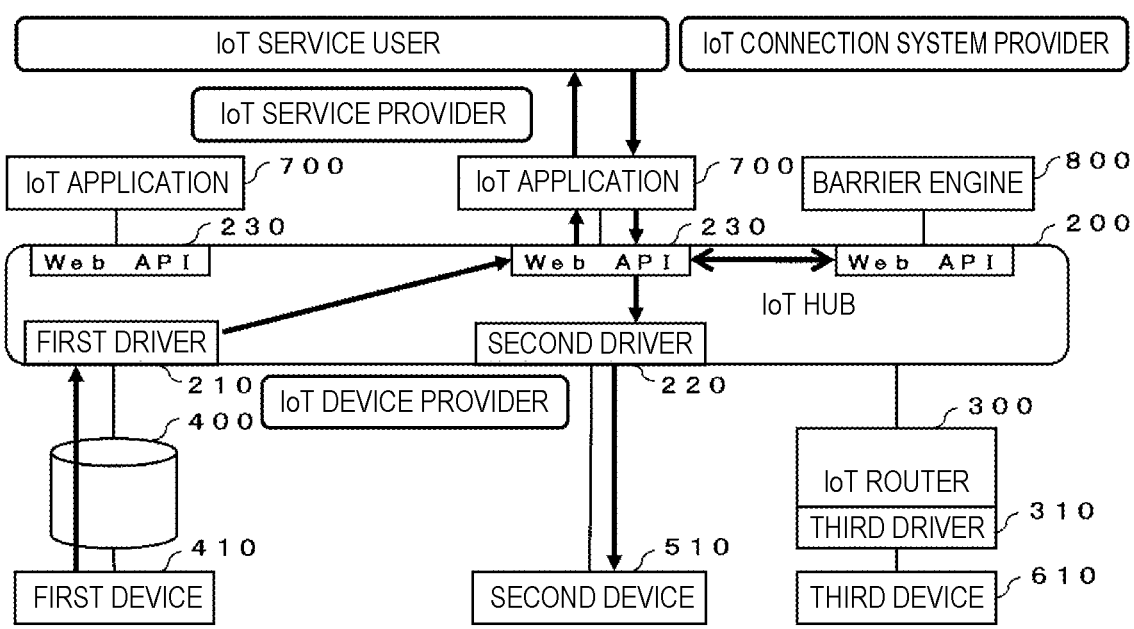
FIG. 14 is an image diagram illustrating another example of a flow of service that is provided by the IoT connection system according to the embodiment of the present invention.

Further, as illustrated in FIG. 14, the IoT hub 200 of the present invention can be connected to a barrier engine 800. This barrier engine 800 checks content of an instruction that the IoT hub 200 sends to the device to prevent inappropriate actions from being executed.

For example, when an IoT service such as "If outside air is refreshing, turn off the air conditioner and open the window" is provided, there is concern that a room will get wet when a guerrilla rainstorm hits immediately after the provision, but the barrier engine 800 prevents such IoT-derived threats.

Further, at least one of the first driver 210, the second driver 220, and the third driver 310 of the present invention can realize a virtual device function.

This virtual device function virtually reproduces the first device 410, the second device 510, or the third device 610.

Figure 15:
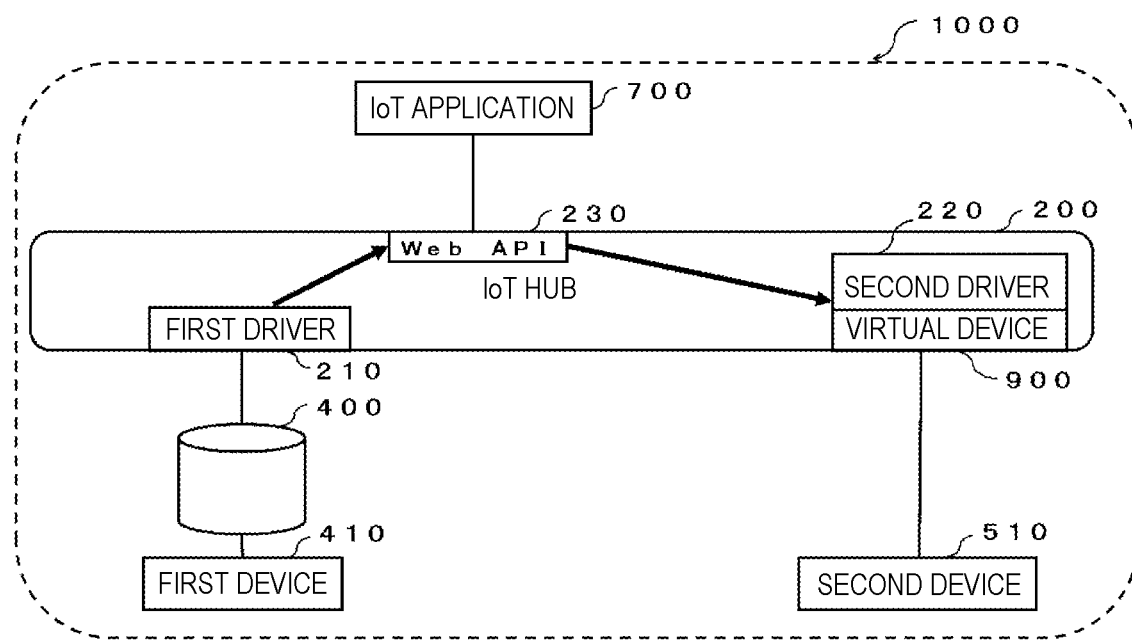
FIG. 15 is an image diagram illustrating an example of a flow of a virtual driver function that is provided in the IoT connection system according to the embodiment of the present invention.

FIG. 15 illustrates an example in which the second driver 220 of the present invention realizes the virtual device function. As illustrated in FIG. 15, providing the second driver 220 with a virtual device 900 capable of reproducing transmission and reception of commands of the second device 510 makes it possible to develop an IoT application using the second device 510 even when the second device 510 is not connected. Further, when there is a malfunction, it is possible to easily isolate a fault one of the second device 510 and the IoT hub 200 without going to the site.

Figure 16:
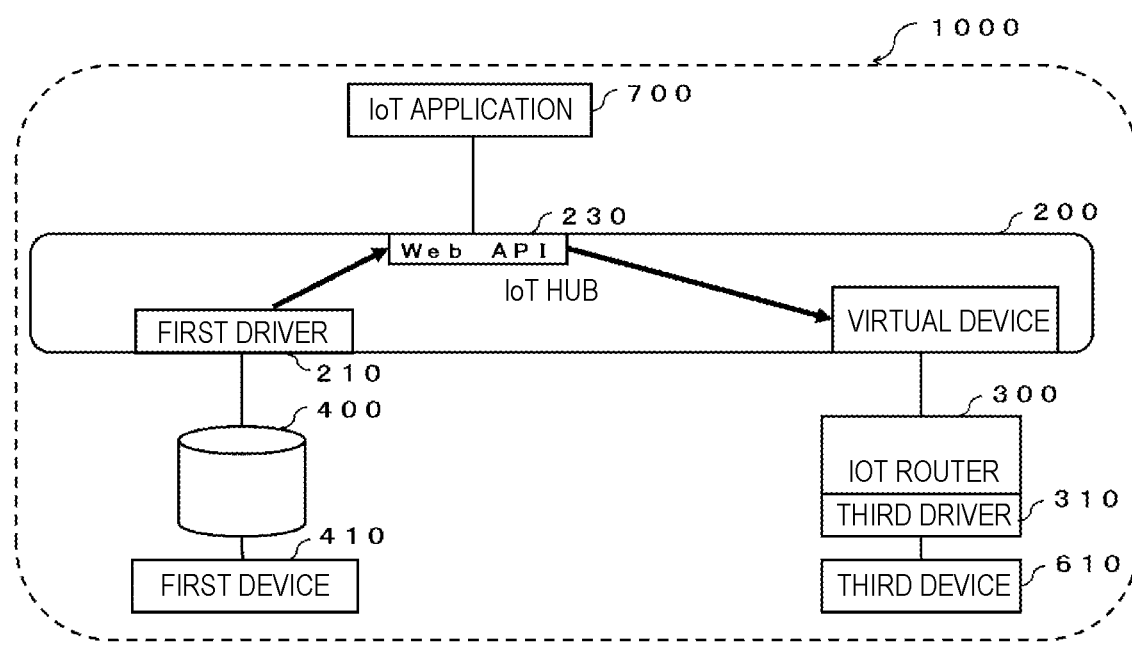
FIG. 16 is an image diagram illustrating another example of a flow of a virtual driver function that is provided in the IoT connection system according to the embodiment of the present invention.

Further, in the present invention, the virtual device function may be realized in the IoT hub 200 instead of the driver, as illustrated in FIG. 16. This is an effective means for fault isolation of the third device 610 connected to the locally existing IoT router 300.

Further, the IoT hub 200 according to the IoT connection system 1000 of the present invention can realize a directory function.

The directory function causes IoT services available via the first device 410, the second device 510, the third device 610, and the IoT hub 200 to cooperate with each other.

That is, the directory function is intended to realize a function of specifying a thing or service and instructing a thing or service from a certain thing (device) to a certain service, from a certain service to a certain thing, or from a certain thing to a certain thing.

Specifically, the directory function can include specifying the first device 410, the second device 510 or the third device 610, or the IoT service, or sending an instruction to the first device 410, the second device 510 or the third device 610, or the IoT service.

Further, in the IoT connection system 1000 of the present invention, the information acquired from the first device 410, the second device 510 or the third device 610 can be not stored in the IoT hub 200.

It is assumed that the IoT connection system 1000 of the present invention is operated by a telecommunications carrier. Because the telecommunications carrier is obliged to comply with confidentiality of communications, the telecommunications carrier will not store information acquired from various devices for other uses.

Because the information is useful, it is common to enclose IoT devices in order to acquire such information exclusively in a private cloud of each company.

On the other hand, the IoT connection system 1000 of the present invention can be operated by the telecommunications carrier, thereby making it possible to interconnect each IoT device and the IoT application from a neutral standpoint and promote IoT business.

Further, because continuity of IoT interconnection service affects continuity of a IoT service of a used company, it is preferable that the used companies jointly share an interconnection infrastructure.

Further, in the IoT connection system 1000 of the present invention, only a device or IoT application permitted by an API key and an authentication scheme can be connected to the IoT hub 200. That is, the IoT connection system 1000 of the present invention can construct a closed network dedicated to IoT communication on the Internet. Further, because a communication path is also encrypted, and an IoT router is also managed by mobile device management (MDM), it is possible to deal with a new attack method or vulnerability in an OS or an application.

Further, in order to connect a non-IoT device to the IoT hub 200, it is possible to perform development in a short period of time by utilizing backend as a service (BaaS) or an SDK.

Further, the provider of the IoT connection system 1000 can propose an interconnection support service for IoT devices. Specifically, it is possible to provide a business matching and consulting service. That is, in order to add an added value, it is possible to search for a necessary partner and introduce value creation patterns and best practices, for example.

Further, it is possible to create attractive services by combining with devices or applications of other companies, and expand business by promoting an added value.

Further, an information processing device such as a computer or a mobile phone can be suitably used to function as the server device or the terminal device according to the embodiment described above. Such an information processing device can be realized by storing a program in which processing content for realizing each function of the server device or the terminal device according to the embodiment has been described in a storage unit of the information processing device, and causing the program to be read and executed by a CPU of the information processing device.

Although several embodiments of the present invention have been described, these embodiments are presented as examples and are not intended to limit the scope of the invention. These novel embodiments can be implemented in various other forms, and various omissions, replacements, and changes can be made without departing from the scope of the invention. These embodiments or modifications thereof are included in the scope or gist of the invention, and are included in the inventions described in the claims and the equivalents thereof.

Further, the schemes described in the embodiments can be stored in, for example, a recording medium such as a magnetic disk (floppy (registered trademark) disk, hard disk, or the like), an optical disc (a CD-ROM, a DVD, an MO, or the like), a semiconductor memory (a ROM, a RAM, a flash memory, or the like) as a program that can be executed by a computer, and can be transmitted and distributed via a communication medium. The program stored in the medium includes a setting program that causes a software means executed by a computer (including not only an execution program but also a table or data structure) to be configured in the computer. A computer that implements the present device executes the above-described processing by reading the program recorded on the recording medium, constructing a software means according to the setting program in some cases, and operating under control of this software means. The recording medium referred to in the present specification is not limited to a recording medium for distribution, but includes a storage medium such as a magnetic disk or a semiconductor memory provided in a computer or a device connected via a network. The storage unit may function as, for example, a main storage device, an auxiliary storage device, or a cache memory.

REFERENCE SIGNS LIST

100 Support system
110 Information processing device
120 User-side terminal
130 Administrator-side terminal
1000 IoT connection system
200 IoT hub
210 First driver
220 Second driver
230 Web API
300 IoT router
310 Third driver
400 Private cloud
410 First device
510 Second device
610 Third device
700 IoT application
800 Barrier engine
900 Virtual device

The invention claimed is:

1. A support method, comprising:
supporting creation of a new service by combining functions of a plurality of devices connected to an internet of things (IoT) hub, the supporting including, in order:
extracting, by an information processing device, a device from the plurality of devices connected to the IoT hub, the device being either capable of realizing a function required by a first user or designated by the first user;
outputting, at a user terminal, a list of operation items of the device so that the first user is able to check the list;
receiving, at the user terminal, an input of a selection of an operation item by the first user from the list of operation items;
outputting, at an administrator terminal, the operation item selected by the first user so that a second user is able to check the operation item, the second user being an administrator of the device;

receiving, at the administrator terminal, an input of availability by the second user with respect to the output selection;

outputting, at the user terminal, the received input so that the first user is able to check the input;

receiving, at the user terminal, an answer input indicating an answer by the first user from among a plurality of options of answers; and outputting, at the administrator terminal, the answer so that the second user is able to check the answer.

2. The support method according to claim 1, wherein the user terminal and the administrator terminal are remotely located from one another.

3. The support method according to claim 1, wherein the information processing device communicates information with the user terminal and the administrator terminal via a network.

4. A support system, comprising:

an information processing device including processing circuitry configured to support creation of a new service by combining functions of a plurality of devices connected to an internet of things (IoT) hub;

a user terminal; and an administrator terminal, wherein the processing circuitry supports creation of the new service by, in order:

extracting a device from the plurality of devices connected to the IoT hub, the device being either capable of realizing a function required by a first user or designated by the first user; and outputting a list of operation items of the device to the user terminal for display at the user terminal, so that the first user is able to check the list and the user terminal receives an input of a selection of an operation item by the first user from the list of operation items;

outputting the operation item selected by the first user to the administrator terminal for display at the administrator terminal, so that a second user is able to check the operation item and the administrator terminal receives an input of availability by the second user with respect to the output selection, wherein the second user is an administrator of the device;

outputting the received input to the user terminal for display at the user terminal, so that the first user is able to check the input and the user terminal receives an answer input indicating an answer by the first user from among a plurality of options of answers; and outputting the answer to the administrator terminal for display at the administrator terminal, so that the second user is able to check the answer.

5. A non-transitory computer readable medium storing computer executable instructions which, when executed by an information processing device, cause the information processing device to:

support creation of a new service by combining functions of a plurality of devices connected to an internet of things (IoT) hub, the supporting including, in order:

extracting a device from the plurality of devices connected to the IoT hub, the device being either capable of realizing a function required by a first user or designated by the first user;

outputting a list of operation items of the device to a user terminal for display at the user terminal, so that the first user is able to check the list and the user terminal receives an input of a selection of an operation item by the first user from the list of operation items;

outputting the operation item selected by the first user to an administrator terminal for display at the administrator terminal, so that a second user is able to check the operation item and the administrator terminal receives an input of availability of the second user with respect to the output selection, wherein the second user is an administrator of the device;

outputting the received input to the user terminal for display at the user terminal, so that the first user is able to check the input and the user terminal receives an answer input indicating an answer by the first user from among a plurality of options of answers; and outputting the answer to the administrator terminal for display at the administrator terminal, so that the second user is able to check the answer.

\* \* \* \* \*